United States Patent [19]
Miskolczy et al.

[11] 3,740,060
[45] June 19, 1973

[54] A SHAFT SEAL
[75] Inventors: Gabor Miskolczy, Carlisle; Robert Kaiser, Cambridge, both of Mass.
[73] Assignee: Avco Corporation, Cincinnati, Ohio
[22] Filed: Nov. 3, 1971
[21] Appl. No.: 195,334

[52] U.S. Cl. .................................................. 277/80
[51] Int. Cl. ........................... F16j 9/00, E21b 33/00
[58] Field of Search ....................... 277/80; 192/21.5

[56] References Cited
UNITED STATES PATENTS
2,557,140  6/1951  Razdowitz ............................ 277/80
2,834,618  5/1958  Wiltse ................................... 277/80

Primary Examiner—Samuel B. Rothberg
Attorney—Charles M. Hogan and Abraham Ogman

[57] ABSTRACT

The invention relates to a shaft seal using a magnetic fluid to seal the clearance gap between a shaft and the housing. The magnetic fluid is held in place by a magnetic field. A modular structure is described which acts as a fluid reservoir, and a magnetic pole piece. The modular structure may also have inherent staging.

8 Claims, 5 Drawing Figures

PATENTED JUN 19 1972

INVENTOR
GABOR MISKOLCZY
ROBERT KAISER

BY Charles M Hogan

ATTORNEYS

INVENTOR
GABOR MISKOLCZY
ROBERT KAISER

ATTORNEYS

A SHAFT SEAL

For purposes of this discussion, a ferrofluid is described as a stable colloidal dispersion of non-interacting super para magnetic particles in a carrier liquid.

The use of a magnetic fluid to seal a shaft has been previously proposed (see article entitled "Magnetic-Fluid Seals," *Machine Design*, Mar. 28, 1968). This invention is an improvement on that concept.

The life of this type of seal is dependent on the presence of ferrofluid. Prior designs suffered from serious limitations and disadvantages, which limited the useful life of this type of seal, namely, the principal limitation, loss of fluid due to evaporation, as well as the loss of fluid with time and for other reasons.

It is an object of the invention to provide a shaft seal which overcomes the limitations and disadvantages of prior art seals.

It is another object of the invention to provide a shaft seal for a magnetic fluid which exhibits greatly improved life and reliability.

It is yet another object of the invention to provide a simply constructed and inexpensive shaft seal which uses a magnetic fluid.

It is yet another object of the invention to provide a magnetic fluid shaft seal containing fluid reservoir means.

Another object of the invention is to provide a magnetic pole structure which includes inherent staging; and It is yet another object of the invention to provide a magnetic fluid shaft seal structure that permits the construction of multi-staging by the use of modular concepts.

In accordance with the invention, a magnetic fluid shaft seal comprises a magnet spaced from the shaft to be sealed, thus creating a clearance gap. A magnetic fluid, such as a ferrofluid, is dispersed in the gap and held therein by the magnetic field of the magnet. The improvement embodied in this invention comprises making at least a portion of the magnetic circuit porous with the pores in fluid communication with the gap. The porous portion of the magnet acts as a magnetic fluid reservoir.

Another improvement comprises making the pole pieces of the magnet with alternately spaced magnetic and non-magnetic members for staging.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

Typically, a magnetic fluid shaft seal contains a magnet which generates a magnetic field across the clearance gap that universally exists between a housing and a shaft. Magnetic fluid is placed in the clearance gap and held in place by the magnetic field. The magnetic fluid seals the gap completely, even against gases, with two limitations.

If the substance that is sealed is a liquid that is soluble in the ferrofluid, it will dilute the ferrofluid causing a proportionate reduction of magnetization. A soluble non-reactive gas will permeate through the ferrofluid.

Secondly, at some pressure differential across the seal above the operating pressure, the magnetic fluid seal is momentarily punctured by the sealed fluid and releases a portion of the sealed fluid until the pressure difference is reduced below the puncture level. Magnetic fluid shaft seals using carrier liquids cited herein have the virtue of resealing when the pressure level is reduced. Each puncture causes a small loss of the sealed substance and may cause a small loss of magnetic fluid. The operating pressure differential will differ for different magnetic fluids and applied fields.

In most one stage devices examined, the seals were punctured at relatively low pressure differentials up to 15 pounds per square inch, depending on the strength of the magnetic field and with existing ferrofluids. This characteristic may be used to provide a pressure relief feature in a seal at from 0 to 15 pounds per square inch per stage, by adjusting the magnetic field through the ferrofluid.

To handle higher pressures, a number of discontinuous zones of higher magnetic field are formed across the clearance gap. A quantity of magnetic fluid is held in place in each high field zone. This series relationship of fields and consequently of seals is called staging. The pressure differential that can be handled increases with the number of stages multipled by the pressure differential capability of an individual stage.

It is well to point out that the seal pressure differential capability is not a function of the length of the magnetic fluid column lateral to the direction of the magnetic field.

Figure 1:
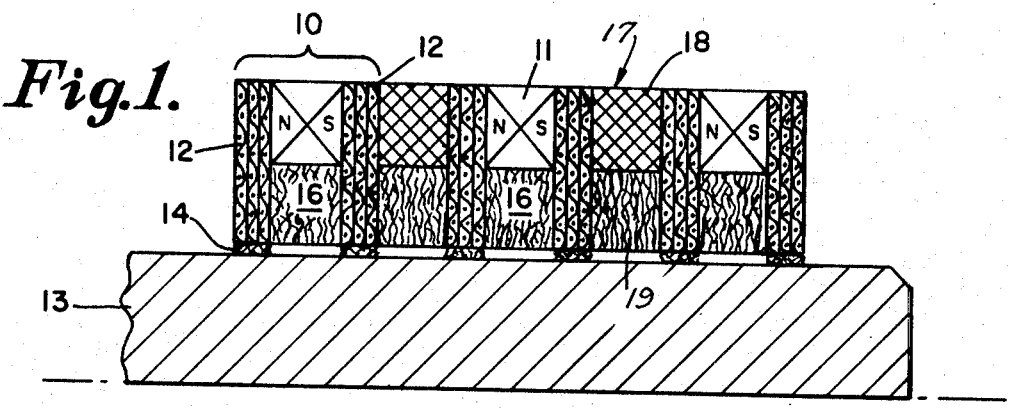
FIG. 1 is a cross-sectional representation of a magnetic fluid shaft seal embodying the principals of the present invention.

Referring to FIG. 1 of the drawings, there is shown a sectional representation of a magnetic fluid shaft seal. The seal is made of three modular assemblies designated by the number 10. Module 10 comprises a magnet 11 flanked by a pair of pole pieces 12. The module 10 is spaced from a shaft 13 and together with the shaft 13 defines a clearance gap in which is positioned a quantity of magnetic fluid such as ferrofluid 14. The ferrofluid 14 completely bridges the gap creating a gas-tight seal.

In the illustration FIG. 1, there are six successive seal stages, one under each pole piece 12. A non-magnetic spacer 16 separates the pole pieces 12.

The design and construction of magnet 11 is not critical and is conventional. It may be a permanent magnet made from any of a number of magnetic alloys or ferrites. The pole pieces 12 are porous magnetic members, while the porosity is an important consideration the specific porous structure may vary to preferred concepts and will be described in detail hereinafter.

The spacer 16 may be formed from a porous non-magnetic material. The pores of the poles 12 and the spacer 16 are in fluid communication with the clearance gap. The purpose of the porosity is to provide reservoir means for supplying ferrofluids 14 to the clearance gap between the pole pieces 12 and the shaft 13.

The shaft 13 will most frequently be made from a ferromagnetic material in order to provide a magnetic path between the pole pieces 12.

On occasion where the spaces separating the pole pieces 12 is small and the strength of the magnet 11 great, it is possible to create a magnetic field between the pole pieces through a non-magnetic shaft by means of a fringe field.

Ferrofluids positioned in a gap between a pole piece 12 and the shaft 13 will be held in position in the gap by the magnetic field bridging the gap. Since the ferrofluid 14 is essentially a liquid, it will completely close the gap and seal the gap against all materials, even gases. An exception to the foregoing occurs when the substance being sealed is soluble or interacts with the ferrofluid 14, as previously discussed.

The ferrofluid 14 comprises a colloidal dispersion of magnetic particles in a carrier liquid. The ferrofluid 14 will remain in place unless the carrier evaporates. Therefore, preferably the liquid components, carrier and surfactant, have a system pressure in the order of $10^{-3}$ or lower, in comparison to the pressure of the system to be sealed. Preferred ferrofluids use a non-volatile carrier liquid such as the high molecular weight per fluorinated polyethers, the Krytox brand of oils, for example, or diffusion pump oils. Because these materils have a very low vapor pressure, the seals have a long life.

Each module 10 is separated by a non-magnetic spacer 17. The non-magnetic spacer 17 is formed of two portions, a solid upper portion 18 and a low porous portion 19. The porous portion 19 also acts as a ferrofluid 14 reservoir.

Figure 2:
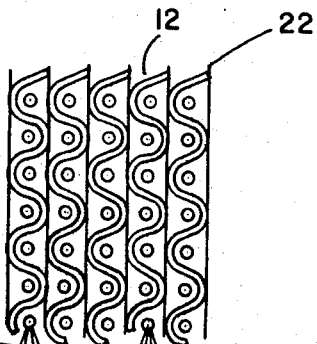
FIG. 2 is an enlarged representation of one form of a porous magnetic pole structure depicting an inherent multi-stage feature.

Referring to FIG. 2 of the drawings, there is shown an enlarged segment of a pole piece 12. The pole pieces 12 is made up, in this instance, of four flat wire mesh washers 22 stacked in a side-by-side position. Each washer 22 is made of a magnetic material. The pole pieces 12 are obviously porous and able to contain a quantity of ferrofluids much greater than is required to seal the gap between the pole pieces 12 and the shaft 13.

Also in FIG. 2, a greatly enlarged representation of the gap area is provided. In particular, it will be noted that the ferrofluid 14 is held in position directly below that portion of the pole piece 12 which is closest to the shaft 13. Though the FIG. 2 representation is somewhat idealized, it is nevertheless representative. It can readily be seen that the seal is actually composed of four separate and distinct stages. The performance of this type of structure is more reliable than one in which the gap is bridged by a single, though wide, pole piece.

Figure 3:
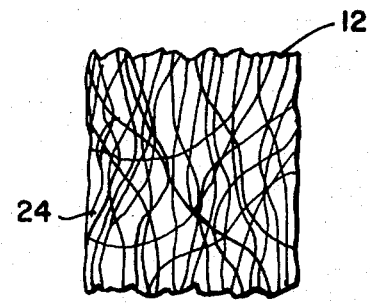
FIG. 3 is an enlargement of a second form of porous magnetic pole piece.

Referring to FIG. 3 of the drawings, the pole pieces 12 described in FIG. 3 is formed by a non-woven material such as steel wool. The porosity of this structure is readily evident. The heterogeneous structure of steel wool also lends itself to forming a plurality of seals such as was described in connection with FIG. 2.

Figure 4:
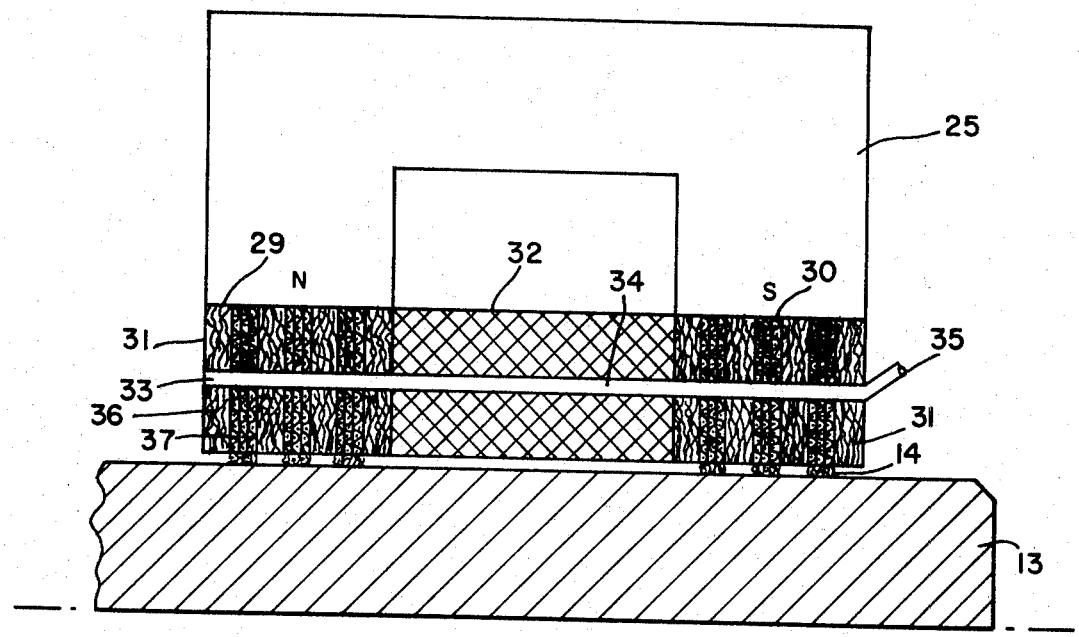
FIG. 4 is a cross-sectional representation of a magnetic fluid seal depicting multiple staging by means of bushings containing alternately spaced magnetic and non-magnetic members.

An alternate magnetic fluid shaft steel structure is shown in FIG. 4. A single magnet 25 with relatively large pole pieces 30 is depicted. The exterior surface 29 of each pole piece 30 is spaced remotely from the shaft 13. The space is filled by a pair of bushings 31, one beneath each pole piece 30. A porous non-magnetic bushing 32 is situated between the bushings 31. Each bushing 31 and 32 contains a co-axial passage 33 used to impregnate or refill the bushings with ferrofluid.

Each of the bushings 31 comprises alternate non-magnetic portions 36 and magnetic portion 37, both of which are porous. The porous bushings 31 and 32 are all in fluid communication with the gap formed by the bushings and the shaft 13 so that ferrofluid contained in these porous bushings can be used to replenish the ferrofluid 14 in the gap; the ferrofluid tends to flow the region of highest magnetic field intensity.

Figure 5:
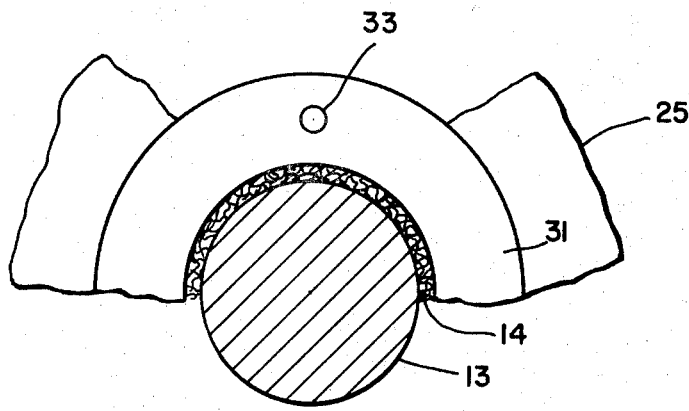
FIG. 5 is a partial sectional representation showing the location of a magnet relative to a shaft with magnetic fluid positioned within the gap defined between the magnet and the shaft.

FIG. 5 is a partial sectional representation showing the FIG. 4 seal from an end view. The magnet 25 is shown containing the bushing 31. The gap between the shaft 13 and the bushing 31 is clearly defined and a quantity of ferrofluid 14 is shown completely filling the gap.

In most instances, the magnetic field will be maximized to maximize the pressure differential that a stage can handle without being punctured. In those cases where the seal is also to provide pressure relief, the strength of the magnetic field may be adjusted to cause the seal to be punctured at a specific pressure in the 0–15 pounds per square inch range per stage.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined vy the following claims.

We claim:

1. A magnetic fluid shaft seal for sealing the clearance gap between a housing and a shaft, said seal comprising:
   a magnet having pole pieces having pores defined therein spaced from a shaft and defining with the shaft a clearance gap and a magnetic field bridging the gap, said porous pole pieces being in fluid communication with said clearance gap; and
   a ferrofluid disposed in the pores of said pole pieces and in said magnetic field in the clearance gap.

2. A magnetic fluid shaft seal as described in claim 1 wherein the pole pieces are wire structures.

3. A magnetic fluid shaft seal as described in claim 2 wherein said wire structure is a non-woven structure.

4. A magnetic fluid shaft seal as described in claim 2 wherein said wire structure comprises a plurality of adjacent wire screens.

5. A magnetic fluid shaft seal as described in claim 1 wherein the magnet has a pair of spaced pole pieces separated by a porous non-magnetic member.

6. A magnetic fluid shaft seal for sealing the clearance gap between a housing and a shaft, said seal comprising:
   a magnet having pole pieces spaced remotely from a shaft;
   a porous bushing disposed between a pole piece and said shaft, said bushing defining a clearance gap with said shaft and a magnetic field across the clearance gap, said bushing being in fluid communication with said clearance gap; and a ferrofluid disposed in the pores of said bushing and in said magnetic field in the clearance gap.

7. A magnetic fluid shaft seal as described in claim 6 wherein the porous bushings comprise alternately side-by-side spaced magnetic and non-magnetic members.

8. A magnetic fluid shaft seal as defined in claim 1 where the strength of the magnet is adjusted to cause the ferrofluid to be punctured by a predetermined pressure differential.

* * * * *

PO-1050
(5/69)

UNITED STATES PATENT OFFICE
CERTIFICATE OF CORRECTION

Patent No. 3,740,060          Dated June 19, 1973

Inventor(s) Gabor Miskolczy and Robert Kaiser

It is certified that error appears in the above-identified patent and that said Letters Patent are hereby corrected as shown below:

Col. 4, line 66, after "bushing" insert --- having pores defined therein ---; Col. 5, line 1, before "bushing" insert --- porous ---; and Col. 5, line 3, before "bushing" insert --- porous ---.

Signed and sealed this 30th day of April 1974.

(SEAL)
Attest:

EDWARD M. FLETCHER, JR.
Attesting Officer

C. MARSHALL DANN
Commissioner of Patents